US012482920B2

(12) United States Patent
Syed et al.

(10) Patent No.: US 12,482,920 B2
(45) Date of Patent: Nov. 25, 2025

(54) ANTENNA UNIT AND METHOD OF PRODUCING AN ANTENNA UNIT

(71) Applicant: NXP B.V., Eindhoven (NL)

(72) Inventors: Waqas Hassan Syed, Helmond (NL); Ralph Matthijs van Schelven, Eindhoven (NL); Giorgio Carluccio, Eindhoven (NL); Pieter Lok, Leur (NL); Antonius Johannes Matheus de Graauw, Haelen (NL); Konstantinos Doris, Amsterdam (NL); Daniele Cavallo, The Haghe (NL); Andrea Neto, Voorburg (NL)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 18/469,605

(22) Filed: Sep. 19, 2023

(65) Prior Publication Data

US 2024/0106105 A1 Mar. 28, 2024

(30) Foreign Application Priority Data

Sep. 26, 2022 (EP) .................................... 22197845

(51) Int. Cl.
*H01Q 1/22* (2006.01)
*H01Q 1/42* (2006.01)
*H01Q 21/06* (2006.01)

(52) U.S. Cl.
CPC ............ *H01Q 1/2283* (2013.01); *H01Q 1/42* (2013.01); *H01Q 21/061* (2013.01)

(58) Field of Classification Search
CPC ........ H01Q 1/2283; H01Q 1/42; H01Q 19/06; H01Q 21/061
See application file for complete search history.

(56) References Cited

U.S. PATENT DOCUMENTS

| | | | | |
|---|---|---|---|---|
| 2010/0327068 A1* | 12/2010 | Chen | H01Q 1/2283 235/492 |
| 2016/0049723 A1* | 2/2016 | Baks | H01Q 9/0457 343/848 |
| 2018/0233465 A1 | 8/2018 | Spella et al. | |
| 2019/0115646 A1* | 4/2019 | Chiu | H01Q 19/062 |
| 2020/0321711 A1 | 10/2020 | Baek et al. | |
| 2020/0402931 A1 | 12/2020 | Chen et al. | |

(Continued)

FOREIGN PATENT DOCUMENTS

CN 111600135 A 8/2020

OTHER PUBLICATIONS

Feresidis, A.P., "High gain planar antenna using optimised partially reflective surfaces," IEE Proc. Microw. Antennas Propag., vol. 148, No. 6, pp. 345-350, Dec. 2001.

(Continued)

*Primary Examiner* — Daniel Munoz

(57) ABSTRACT

In accordance with a first aspect of the present disclosure, an antenna unit is provided, comprising: an integrated circuit package containing an integrated circuit die and an antenna structure coupled to the integrated circuit die; a dielectric layer separated from the integrated circuit package, wherein the dielectric layer is placed at a predefined distance above an upper surface of the integrated circuit package. In accordance with a second aspect of the present disclosure, a corresponding method of producing an antenna unit is conceived.

18 Claims, 17 Drawing Sheets

(56) References Cited

U.S. PATENT DOCUMENTS

| | | | |
|---|---|---|---|
| 2020/0412006 A1 | 12/2020 | Wu et al. | |
| 2021/0328362 A1 | 10/2021 | Park et al. | |
| 2022/0302574 A1 | 9/2022 | Chiu et al. | |

OTHER PUBLICATIONS

Jackson, D.R., "A leaky-wave analysis of the high-gain printed antenna configuration," IEEE Transactions on Antennas and Propagation, vol. 36, Issue 7, Jul. 1988.
Neto, A., "EBG Enhanced Feeds for the Improvement of the Aperture Efficiency of Reflector Antennas," IEEE Transactions on Antennas and Propagation, vol. 55, No. 8, Aug. 2007.
Trentini, G.V., "Partially Reflecting Sheet Arrays", IRE Transactions on Antennas and Propagation, vol. 4, Issue 4, Oct. 1956.
Texas Instruments, "AWR1843AOP Single-chip 77- and 79-GHz FMCW radar sensor", Datasheet, Figs 7.2,7.3 and 7.4, SWRS236A—Mar. 2021—Revised Sep. 2021.
Texas Instruments, "AWR6843AOP Single-Chip 60- to 64-GHz mmWave Sensor Antennas-On-Package (AOP)", Datasheet, Fig 8.1-8.2, SWRS246C—Nov. 2020—Revised Jul. 2022.

* cited by examiner

ANTENNA UNIT AND METHOD OF PRODUCING AN ANTENNA UNIT

CROSS-REFERENCE TO RELATED APPLICATIONS

This application claims the priority under 35 U.S.C. § 119 of European Patent application no. 22197845.5, filed on 26 Sep. 2022, the contents of which are incorporated by reference herein.

TECHNICAL FIELD

The present disclosure relates to an antenna unit. Furthermore, the present disclosure relates to a corresponding method of producing an antenna unit.

BACKGROUND

Antenna units are often designed for specific applications. It may be desirable to provide an antenna unit which supports multimode applications, for example in communication scenarios and automotive radar scenarios.

SUMMARY

In accordance with a first aspect of the present disclosure, an antenna unit is provided, comprising: an integrated circuit package containing an integrated circuit die and an antenna structure coupled to the integrated circuit die; a dielectric layer separated from the integrated circuit package, wherein the dielectric layer is placed at a predefined distance above an upper surface of the integrated circuit package.

In one or more embodiments, the dielectric layer is separated from the integrated circuit package by a layer of air.

In one or more embodiments, the antenna unit further comprises a plurality of support posts between a lower surface of the dielectric layer and the upper surface of the integrated circuit package.

In one or more embodiments, the support posts are placed outside a field of view of the antenna structure.

In one or more embodiments, the dielectric layer is separated from the integrated circuit package by a further dielectric layer having a dielectric constant close to one.

In one or more embodiments, the further dielectric layer is a layer of low loss foam.

In one or more embodiments, the dielectric layer is a partially reflective dielectric layer or an artificial dielectric layer formed by a patterned metal layer.

In one or more embodiments, the dielectric layer has a thickness of approximately 60 micrometers.

In one or more embodiments, the predefined distance is approximately 300 micrometers.

In one or more embodiments, a surface of the dielectric layer is larger than the upper surface of the integrated circuit package, and parts of the dielectric layer that do not cover the upper surface of the integrated circuit package have a larger thickness than parts of the dielectric layer that cover said upper surface.

In one or more embodiments, the dielectric layer is configured to function as a radome.

In one or more embodiments, the antenna unit further comprises a radome placed above the dielectric layer and the integrated circuit package.

In one or more embodiments, the antenna structure comprises an array of planar slot antenna elements, an array of planar dipole antenna elements, or an array of planar patch antenna elements.

In one or more embodiments, a communication device, in particular a radar communication device, comprises an antenna unit of the kind set forth.

In accordance with a second aspect of the present disclosure, a method of producing an antenna unit is conceived, comprising: providing the antenna unit with an integrated circuit package, said integrated circuit package containing an integrated circuit die and an antenna structure coupled to the integrated circuit die; placing a dielectric layer at a predefined distance above an upper surface of the integrated circuit package, thereby separating the dielectric layer from the integrated circuit package.

DESCRIPTION OF DRAWINGS

Embodiments will be described in more detail with reference to the appended drawings.

DESCRIPTION OF EMBODIMENTS

As mentioned above, antenna units are often designed for specific applications. It may be desirable to provide an antenna unit which supports multimode applications, for example in communication scenarios and automotive radar scenarios. For instance, so-called antenna-in-package (AiP) and antenna-on-package (AoP) solutions can typically not be used to simultaneously satisfy requirements for blind spot detection (BSD) and lane change assist (LCA) automotive applications, such as the requirements defined by the European New Car Assessment Programme (Euro NCAP). An example of an AiP solution is described in US 2018/0233465 A1. The fact that the aforementioned requirements cannot be satisfied simultaneously is mainly caused by the limitation in the half power beam width (HPBW) of the pattern of a typical antenna element. This limitation also results in a high scan loss for large angles (such as 45° in azimuth), when antenna elements are used in a phased array configuration.

Moreover, current AiP and AoP solutions are based on an antenna embedded in dielectric parts of the packages, said parts having a relative dielectric constant $\varepsilon_r$ greater than two, which supports surface waves. A mitigation of surface wave phenomena can be achieved by using package-embedded artificial dielectric layers (ADL), such as described in US 2018/0233465 A1, or electromagnetic bandgap (EBG) structures. However, the implementation of such structures has limitations at high frequencies (such as 140 GHz), because of constraints on the thickness of the package, which does not scale with frequency due to commercially available manufacturing processes. This results in the generation of high-order surface modes, which can lead to a significant deterioration of antenna performance. For example, the antenna may suffer from higher losses and a more dispersive radiation patterns.

Now discussed are an antenna unit and a corresponding method of producing an antenna unit, which facilitate supporting multimode applications, for example in communication scenarios and automotive radar scenarios. For instance, the presently disclosed antenna unit facilitates simultaneously satisfying requirements of BSD and LCA automotive applications.

Figure 1:
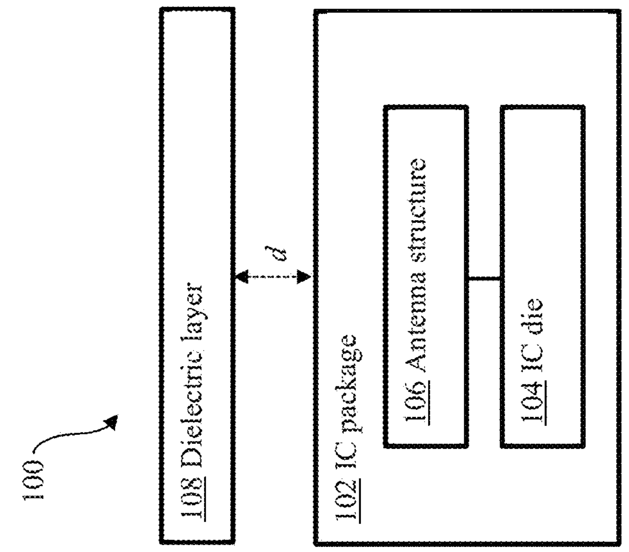
FIG. 1 shows an illustrative embodiment of an antenna unit.

FIG. 1 shows an illustrative embodiment of an antenna unit. The antenna unit 100 comprises an integrated circuit package 102 and a dielectric layer 108. The integrated circuit package 102 contains an integrated circuit die 104 and an antenna structure 106 coupled to the integrated circuit die 104. Furthermore, the dielectric layer 108 is separated from the integrated circuit package 102. More specifically, the dielectric layer 108 is placed at a predefined distance d above an upper surface of the integrated circuit package 102. By providing an antenna unit with a separate dielectric layer placed at a predefined distance above an upper surface of the package that contains the antenna structure, the antenna unit may perform well in different operational modes. More specifically, the radiation pattern of the antenna structure may be enhanced at specific angular regions, such that different application requirements can be satisfied simultaneously.

In one or more embodiments, the dielectric layer is separated from the integrated circuit package by a layer of air. This results in a practical implementation of the antenna unit. Furthermore, in that case the distance between the dielectric layer and the upper surface of the integrated circuit package corresponds to the height of the air layer, which may easily be co-designed with the dielectric layer to enhance the radiation pattern of the antenna structure at specific angular regions. In one or more embodiments, the antenna unit further comprises a plurality of support posts between a lower surface of the dielectric layer and the upper surface of the integrated circuit package. In this way, the air layer may easily be created and the height of said air layer may easily be fixed. In one or more embodiments, the support posts are placed outside a field of view of the antenna structure. In this way, the performance of the antenna structure is not negative affected by the support posts. In one or more embodiments, the dielectric layer is separated from the integrated circuit package by a further dielectric layer having a dielectric constant close to one. This results in an alternative practical implementation of the antenna unit. In one or more embodiments, the further dielectric layer is a layer of low loss foam. A layer of low loss foam is a particularly suitable implementation of the further dielectric layer.

In one or more embodiments, the dielectric layer is a partially reflective dielectric layer or an artificial dielectric layer formed by a patterned metal layer. Both a partially reflective dielectric layer and an artificial dielectric layer are particularly suitable implementations of the dielectric layer, by means of which the radiation pattern of the antenna structure can be optimized. In one or more embodiments, the dielectric layer has a thickness of approximately 60 micrometers. In this way, the radiation pattern of the antenna structure may be enhanced effectively. Furthermore, in one or more embodiments, the predefined distance is approximately 300 micrometers. This also contributes to an effective enhancement of the radiation pattern of the antenna structure. It is noted that the mentioned dimensions, i.e. 60 and 300 micrometers, are consistent with AiP solutions at 77 GHz and 140 GHz frequency bandwidths. However, the skilled person will appreciate that at other frequencies the dimensions should be properly scaled to target the desired pattern shaping.

In one or more embodiments, a surface of the dielectric layer is larger than the upper surface of the integrated circuit package, and parts of the dielectric layer that do not cover the upper surface of the integrated circuit package have a larger thickness than parts of the dielectric layer that cover said upper surface. In this way, the mechanical robustness of the antenna unit may be increased. Furthermore, on one or more embodiments, the dielectric layer is configured to function as a radome. In this way, the antenna unit may be protected without an additional radome. Alternatively, the antenna unit further comprises a radome placed above the dielectric layer and the integrated circuit package. This results in an alternative practical implementation of a structure that protects the antenna unit. Furthermore, in one or more embodiments, the antenna structure comprises an array of planar slot antenna elements, an array of planar dipole antenna elements, or an array of planar patch antenna elements. In combination with the dielectric layer placed above the package, these arrays result in particularly suitable implementations that support multimode applications.

Figure 2:
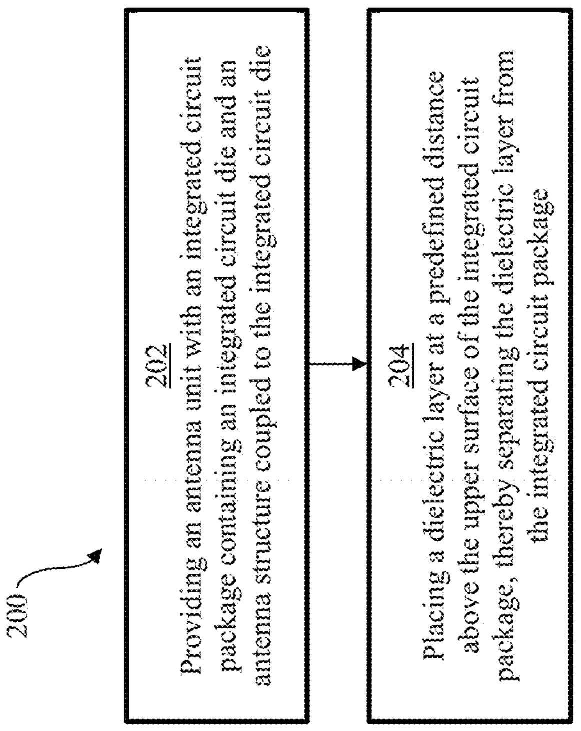
FIG. 2 shows an illustrative embodiment of a method of producing an antenna unit.

FIG. 2 shows an illustrative embodiment of a method 200 of producing an antenna unit. The method 200 comprises the following steps. At 202, an antenna unit is provided with an integrated circuit package that contains an integrated circuit die and an antenna structure coupled to the integrated circuit die. Furthermore, at 204, a dielectric layer is placed at a predefined distance above an upper surface of the integrated circuit package, thereby separating the dielectric layer from the integrated circuit package. As mentioned above, by providing an antenna unit with a separate dielectric layer placed at a predefined distance above an upper surface of the package that contains the antenna structure, the antenna unit may perform well in different operational modes. More specifically, the radiation pattern of the antenna structure may be enhanced, such that different application requirements can be satisfied simultaneously.

The presently disclosed antenna solution supports multimode applications for communication scenarios or automotive radar scenarios. In particular, the presently disclosed antenna unit may radiate patterns which are suitable for both blind spot detection (with a large half power beamwidth) and lane change assistance (with a directive pattern) in automotive applications. Moreover, in case of lane change assistance, which aims at a pattern pointing in a tilted direction with respect to broadside, the presently disclosed antenna unit may allow a reduction of the pattern scan loss, thus allowing an improvement of radar performance in terms of maximum range with respect to existing AiP solutions. In a practical implementation, the antenna unit may comprise elementary planar slot antenna elements used in an array configuration, in combination with a partially reflective dielectric layer (PRDL) or artificial dielectric layer (ADL) located in the close proximity of the array. The slot array is integrated in the package, which is compatible with different packaging technologies, such as embedded wafer-level ball-grid-array (eWLB) and flip chip-chip scale package (FC-CSP). In contrast, the dielectric layer is located on top of the package. The distance between the dielectric layer and the upper surface of the package, as well as the relevant dielectric constant, may be engineered to achieve a desired performance. More specifically, a PRDL or ADL may be used, which is separated from a radiating element (e.g., a slot antenna) by an air layer or by a further dielectric layer having a dielectric constant close to 1 (e.g., a foam). The height of this air layer or further dielectric layer may be co-designed with the PRDL or ADL to enhance the radiation in a direction to satisfy applications such as LCA and BSD. In particular, the antenna unit may operate at a frequency of 77 GHz or 140 GHz, for example.

Figure 3:
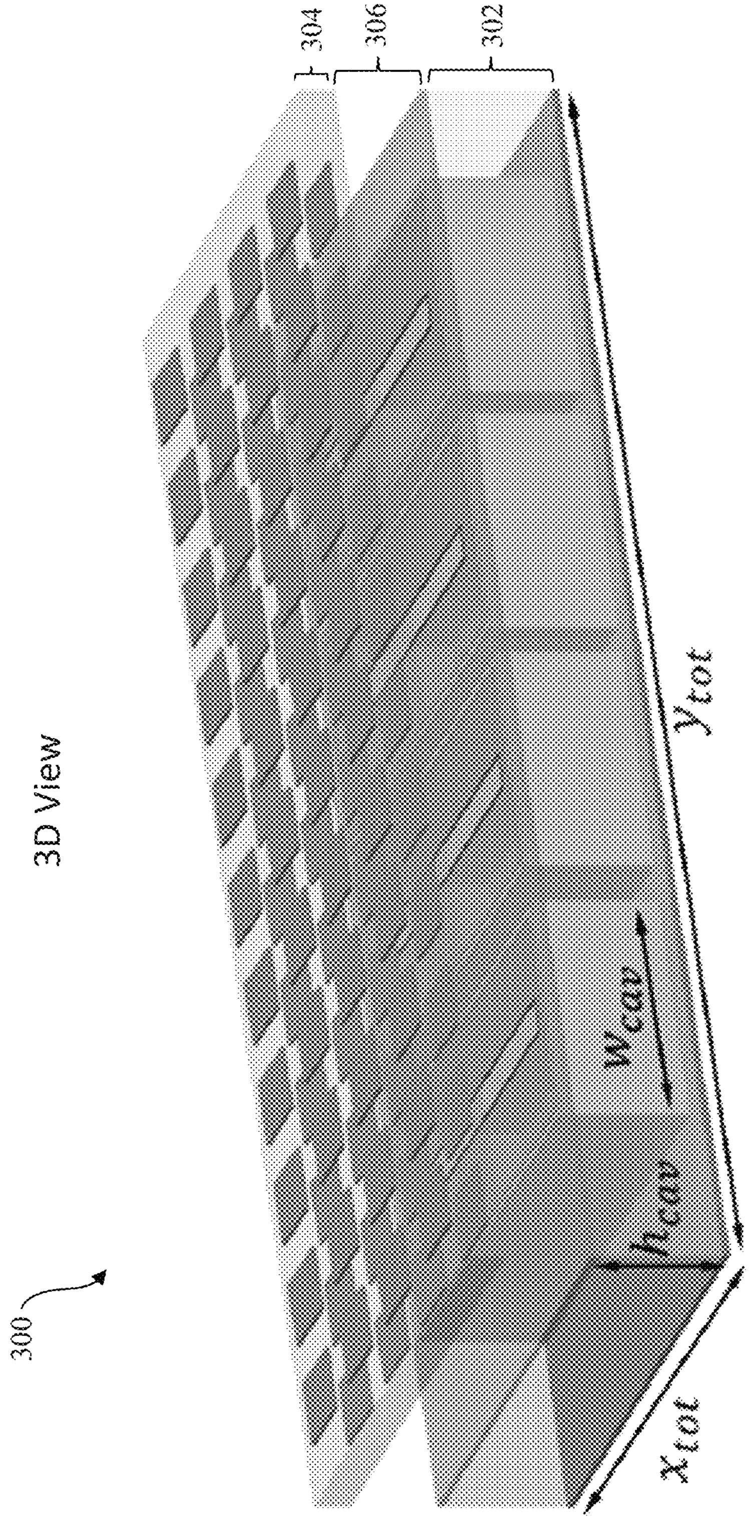
FIG. 3 shows an illustrative embodiment of an antenna unit in a three-dimensional view.

FIG. 3 shows an illustrative embodiment of an antenna unit 300 in a three-dimensional view. The antenna unit 300 comprises an integrated circuit package 302 in which a slot antenna is embedded. Furthermore, the antenna unit 300 comprises a dielectric layer 304, which is separated from the integrated circuit package 302 by a layer of air 306. The dielectric layer 304 may be implemented as an artificial dielectric layer, as described in US 2018/0233465 A1. Such an artificial dielectric layer—which may also be referred to as a capacitive grid—is a patterned layer which includes a regular grid of metal squares. The skilled person will appreciate that aperture antennas in combination with partially reflective surfaces may achieve a high directivity. The gain enhancement is due to leaky waves that propagate along the structure to create a larger effective radiating aperture. The antenna unit 300 facilitates achieving an element pattern with the largest possible beamwidth for wide field-of-view applications. To this end, a dielectric layer 304—which may also be referred to as a superstrate—is used, which may be electrically close to the radiating structure (i.e., the antenna structure comprised in the package 302), so that the leaky-wave radiation has low directivity and points at angles far from broadside. By controlling the amplitude and phase of the antenna elements, an adaptive array may be realized, which can dynamically change its radiation beamwidth. It is noted that the parameters $w_{cav}$ and $h_{cav}$ represent the width and the height, respectively, of the cavity below the slot. Typical values, which may be based on existing designs, may be in the order of 1.25 mm for $w_{cav}$ and 375 um for $h_{cav}$. Furthermore, a typical value for $x_{tot}$ may be 4 mm and a typical value for $y_{tot}$ may be 11 mm. Again, these values may be based on existing designs.

Figure 4:
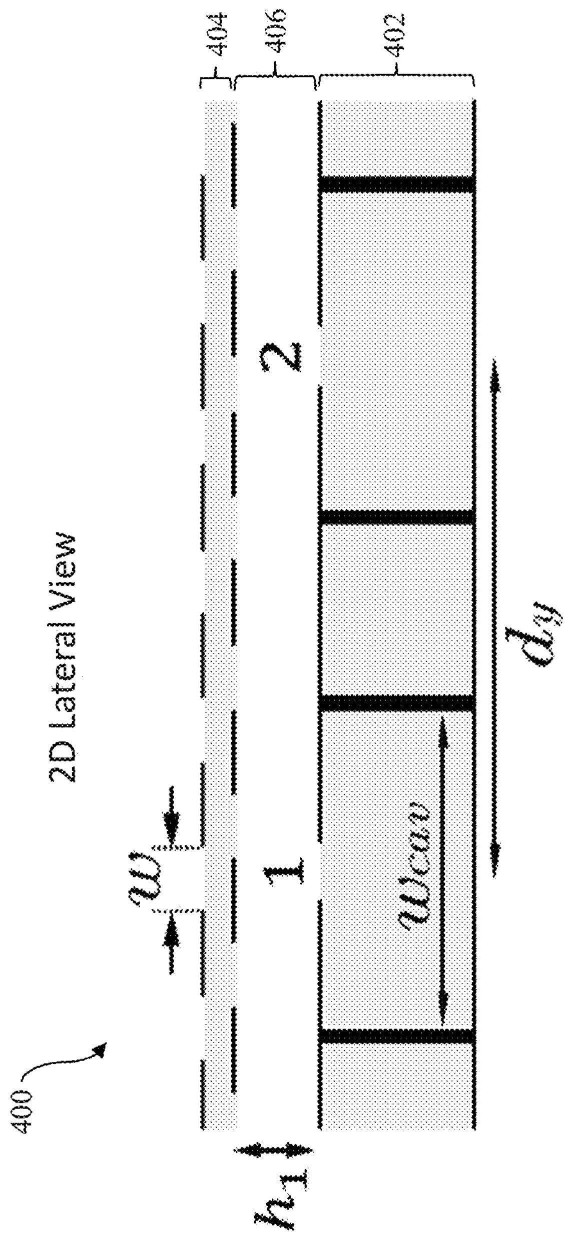
FIG. 4 shows an illustrative embodiment of an antenna unit in a two-dimensional lateral view.

FIG. 4 shows an illustrative embodiment of an antenna unit 400 in a two-dimensional lateral view. In particular, a cross-section is shown of the antenna unit shown in FIG. 3. The antenna unit 400 contains an integrated circuit package 402 and a dielectric layer 404, which is separated from the integrated circuit package 402 by a layer of air 406. The height h1 of the layer of air 406 corresponds to the distance between the dielectric layer 404 and the integrated circuit package 402. As mentioned above, the antenna unit 400 facilitates achieving an element pattern with the largest possible beamwidth for wide field-of-view applications. It is noted that FIG. 4 shows a side view of the array, zoomed in on only two slots with their cavities below and the ADL on top. The parameter w represents the distance between adjacent patches of the ADL; a suitable value for this parameter, which may be based on existing designs, is 150 um. The parameter $w_{cav}$ represents the width of the cavity below the slot. A suitable value, which may again be based on existing designs, may be in the order of 1.25 mm. Furthermore, the parameter $d_y$ represents the distance between adjacent antenna elements. In order to avoid grating lobes while scanning, this parameter may typically be set to half of the wavelength, which corresponds to 1.875 mm at 80 GHz. Furthermore, the parameter h1 is again the distance between the slot plane and the ADL; this parameter corresponds to the parameter d shown in FIG. 1.

Instead of a superstrate implemented as an artificial dielectric layer, an electromagnetic bandgap (EBG) superlayers may be used to obtain a desired pattern shaping. It is noted that an EBG superlayer forms a partially reflective surface which is different from the above-described ADL. The shape of the radiation patterns of slots in ground planes embedded in the package may be optimized for BSD and LCA applications by properly tuning the superlayer's geometrical parameters. This has the benefit that no metal printing of ADLs is required, but the degrees of freedom provided by ADLs may be lost. An example of an EBG superlayer is described in the article "EBG Enhanced Feeds for the Improvement of the Aperture Efficiency of Reflector Antennas", written by A. Neto et al. and published in *IEEE Transactions on Antennas and Propagation*, vol. 55, no. 8, pp. 2185-2193, August 2007.

Figure 5:
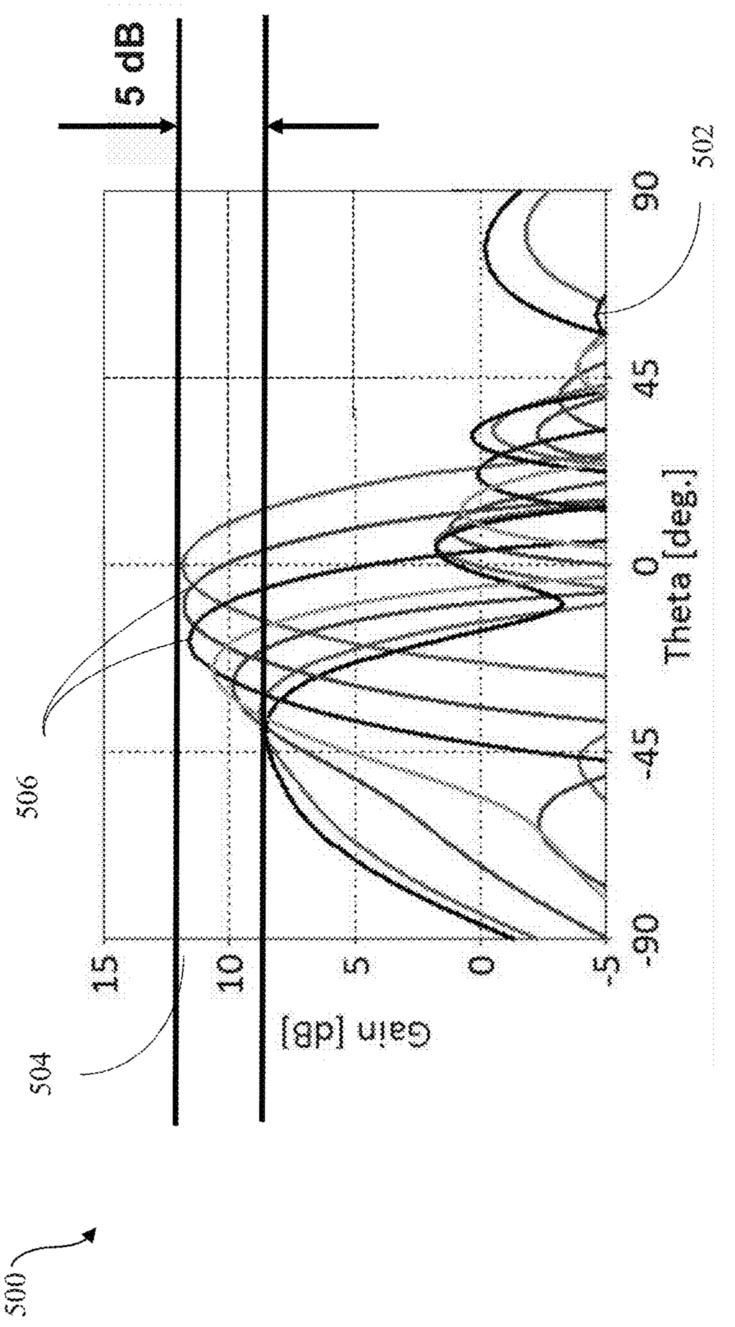
FIG. 5 shows an example of a radiation pattern in an E-plane.
Figure 6:
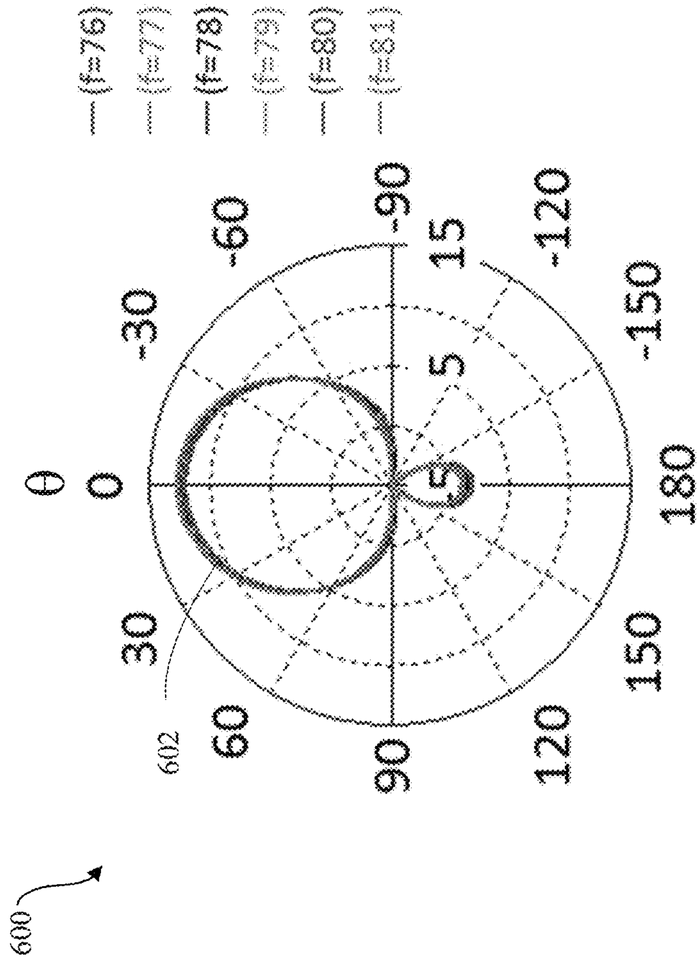
FIG. 6 shows an example of a polar plot in a corresponding H-plane.

FIGS. 5 and 6 show array antenna patterns 500 in E-plane, for the case of liner array of slots, and a single element antenna pattern 600 in both E-plane and H-plane. In particular, these patterns may be obtained by an antenna-in-package solution as described in US 2018/0233465 A1. More specifically, FIG. 6A highlights that a scan loss of about 5 dB is obtained when an array of 4 elements is scanning at 45°. This is due to the shape of the pattern of the single element of the array (shown in FIG. 6B), which presents a HPBW of about 70°.

Figure 7B:
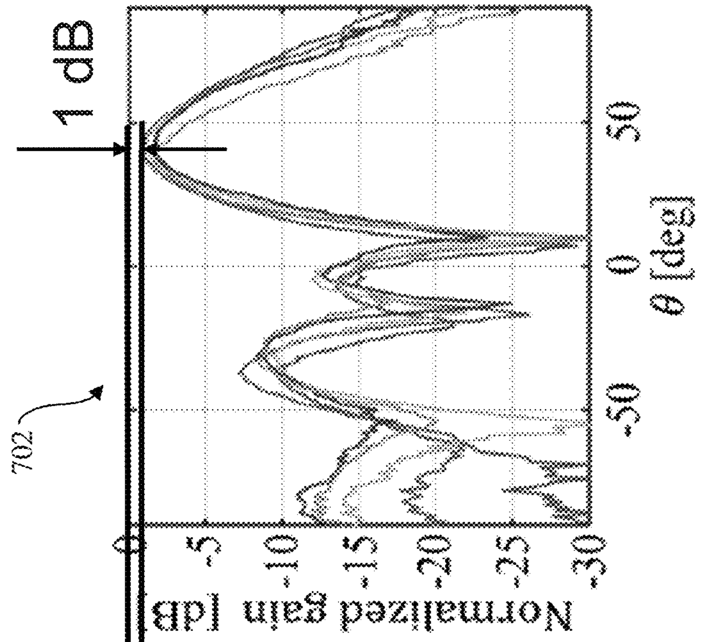
FIG. 7B shows a second radiation plot in the E-plane.
Figure 7A:
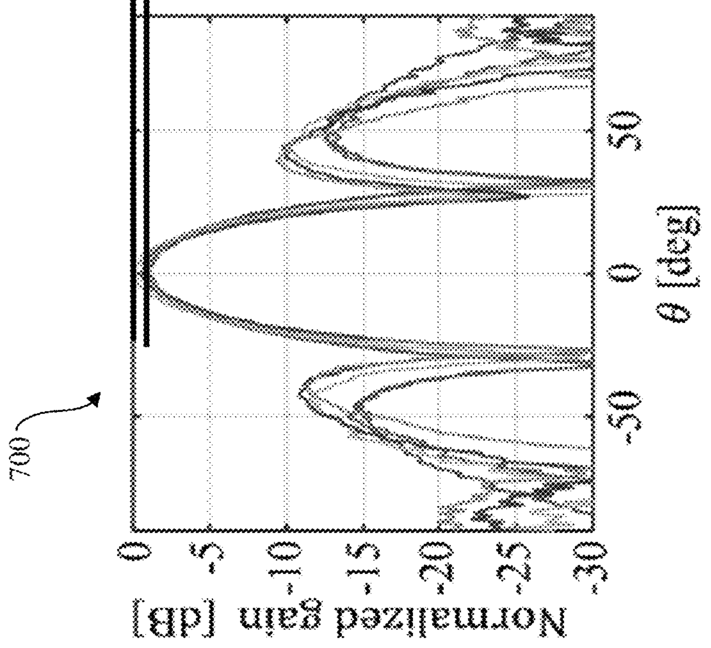
FIG. 7A shows a first radiation plot in an E-plane.
Figure 7C:
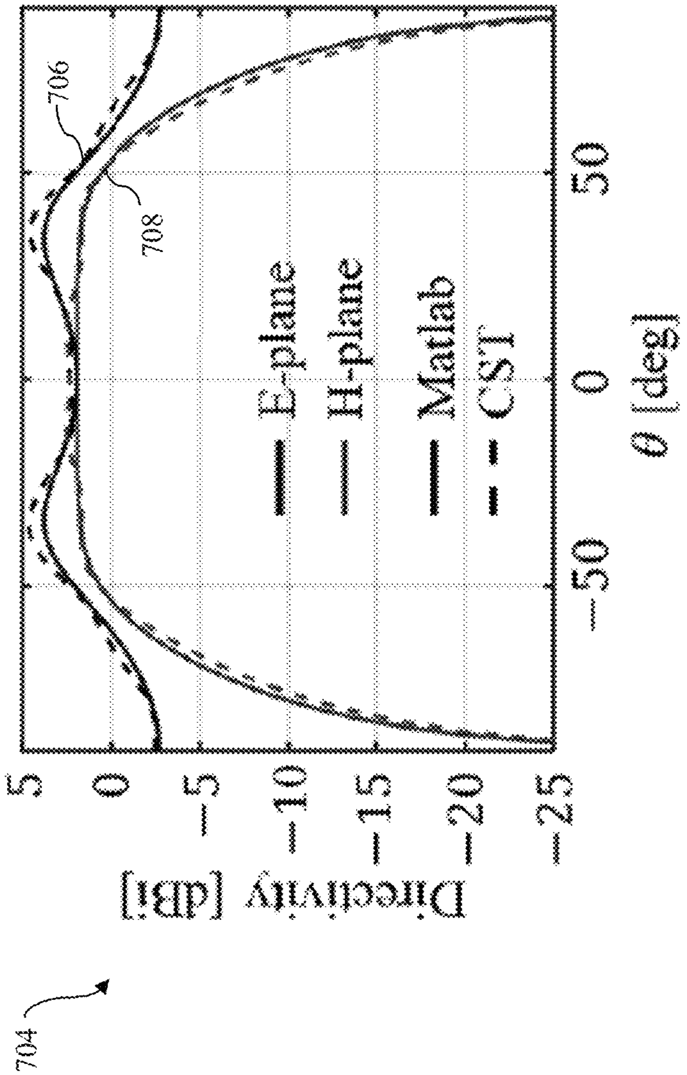
FIG. 7C shows a corresponding radiation pattern of a single antenna element of the array in the E-plane.

FIGS. 7A to 7C show a first radiation plot 700 in an E-plane, a second radiation plot 702 in the E-plane, and a corresponding radiation pattern 704 of a single antenna element of the array in the E-plane, respectively. In particular, it is shown that the presently disclosed antenna unit may achieve a reduction of the loss to 1-2 dB. More specifically, FIGS. 7A and 7B show the patterns achievable with an array of 4 slots embedded in a package in combination with designed ADL layers at a specific distance from the package. When scanning at 45° the scan loss is reduced to 1-2 dB. This is obtained thanks to the shape of the element pattern that, in this specific design, presents an HPBW of about 110° in the antenna E-plane (FIG. 7C).

Figure 8A:
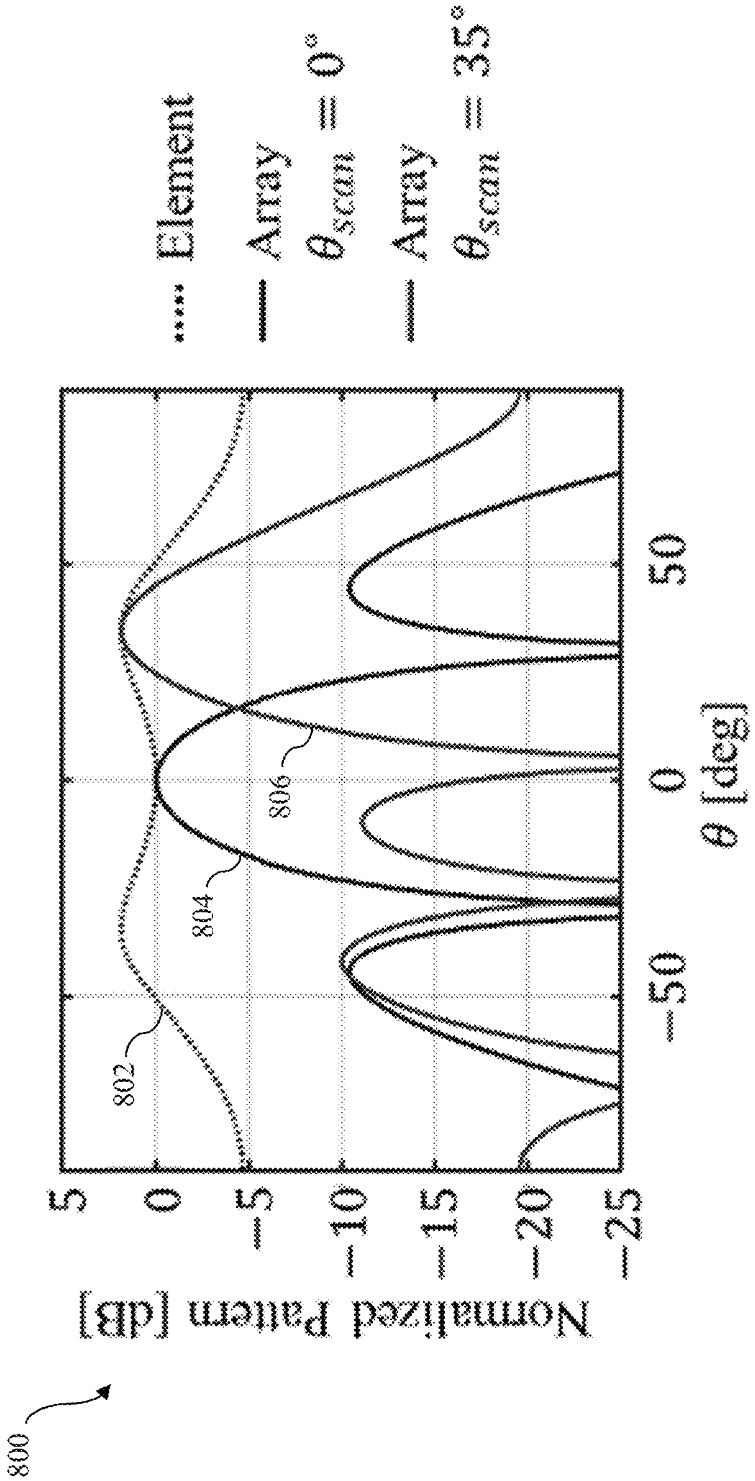
FIG. 8A shows a normalized radiation pattern.
Figure 8B:
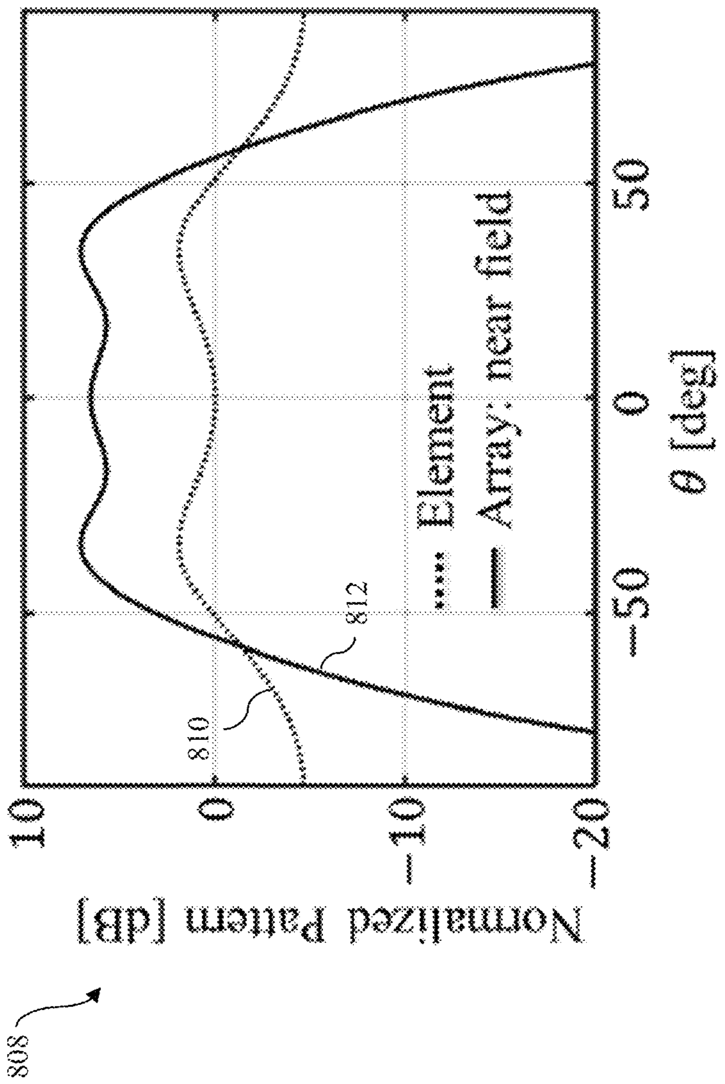
FIG. 8B shows a normalized radiation pattern when the array is fed for focusing the electromagnetic field in near field regions.

FIGS. 8A and 8B show normalized radiation patterns 800, 808. More specifically, FIG. 8B shows a normalized radiation pattern 808 when the array is fed for focusing the electromagnetic field in near field regions. The presently disclosed antenna unit may be used to advantage in various applications. In particular, to obtain an array radiation pattern suitable for LCA applications a directive beam may be used, pointing at 45° with respect to the AiP surface (line 806 in FIG. 8A). Furthermore, to obtain a single element radiation pattern suitable for BSD applications a wide HPBW may be used (line 810 in FIG. 8B). Furthermore, the presently disclosed antenna may be used to obtain an array radiation pattern with a proper amplitude and phase antenna feeding, which is suitable for BSD applications with an increased gain, thus improving sensor BSD range/SNR performance (line 812 in FIG. 8B).

Figure 9A:
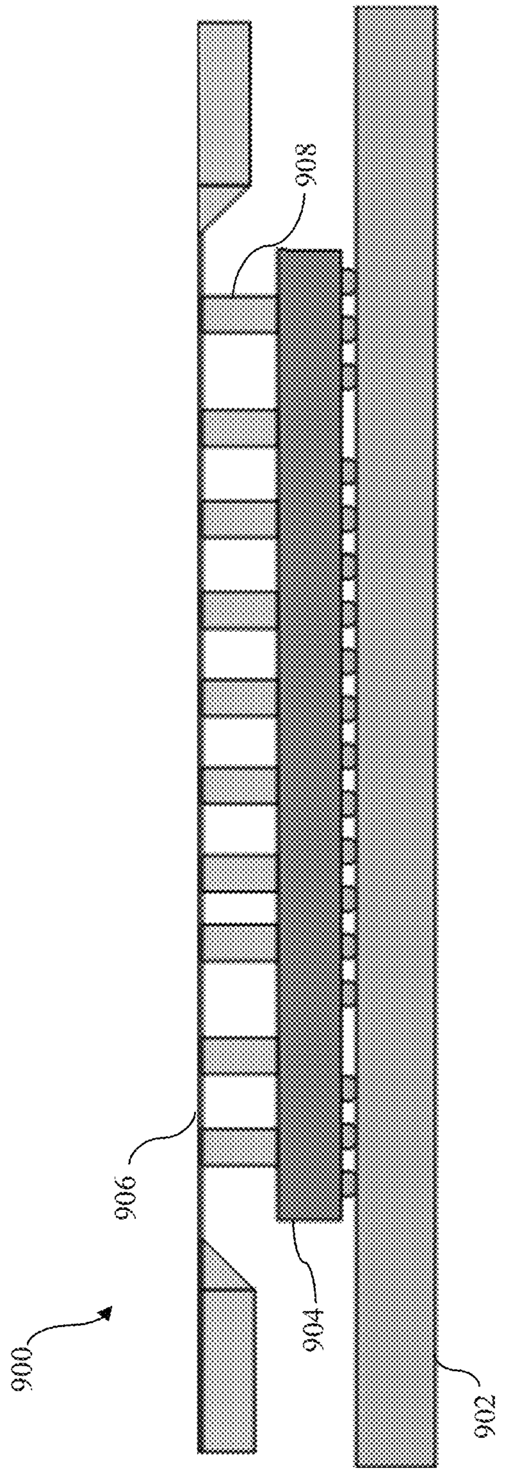
FIG. 9A shows a cross-section of antenna unit according to an illustrative embodiment.
Figure 9B:
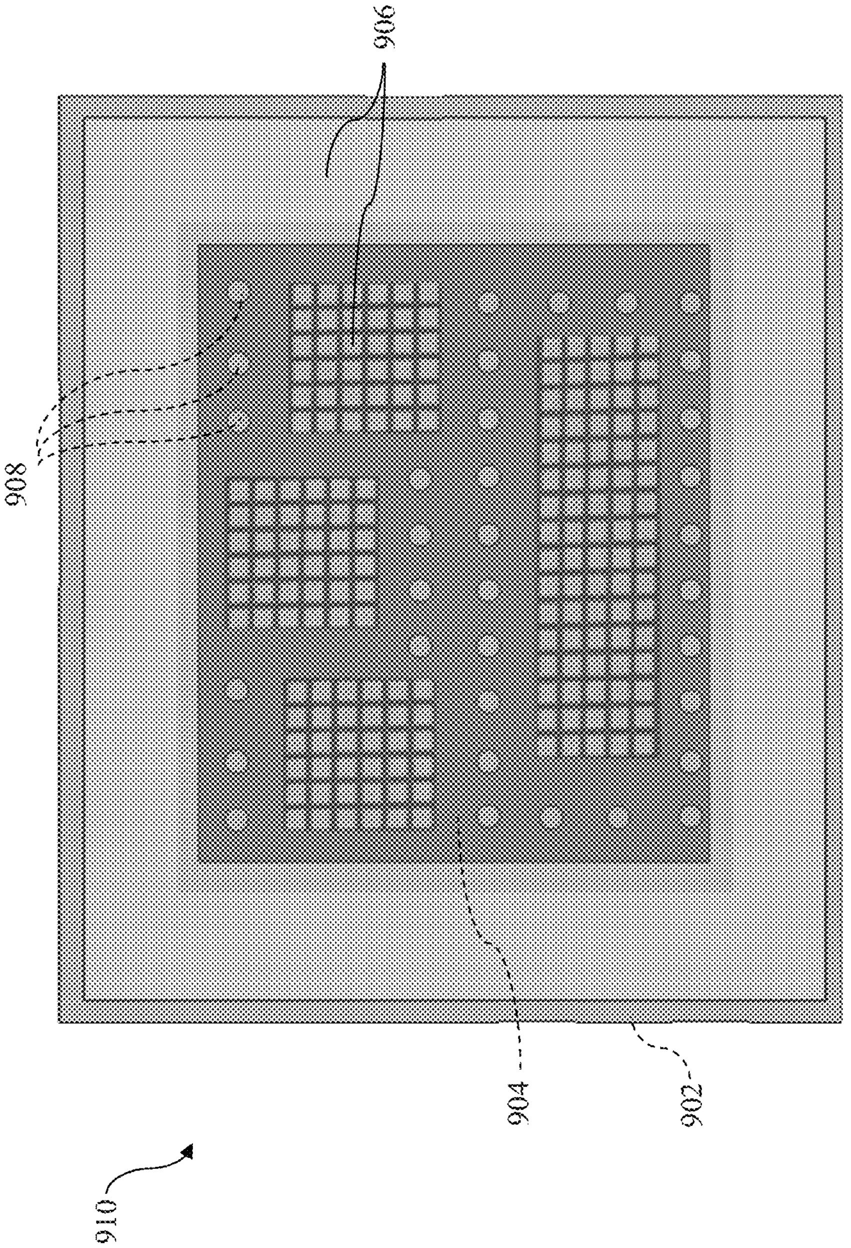
FIG. 9B shows a plan view of the antenna unit shown in FIG. 9A.

FIGS. 9A and 9B show a cross-section 900 and a plan view 910, respectively, of antenna unit according to an illustrative embodiment. The antenna unit contains an integrated circuit package 904 and a dielectric layer 906 placed above the upper surface of the integrated circuit package 904. The dielectric layer 906 is separated from the integrated circuit package 904 by a layer of air. A plurality of support posts 908 is provided between the dielectric layer 906 and the upper surface of the integrated circuit package 904, in order to realize the separation. Outside the area of the integrated circuit package 904 (i.e., where the dielectric layer 906 does not cover the upper surface of the integrated circuit package 904) the dielectric layer 906 may be thicker than inside the area of the integrated circuit package 904. In this way, the mechanical robustness of the antenna unit may be increased. Furthermore, the dielectric layer 906 is configured to function as a radome. Furthermore, the antenna unit is placed on a printed circuit board 902. Above the area of the integrated circuit package 904, the dielectric layer 906 has a thickness of approximately 60 micrometers. Furthermore, the dielectric layer 906 is implemented as an artificial dielectric layer as defined above. Furthermore, the support posts 908 between the upper surface of the integrated circuit package 904 and the dielectric layer 906 are placed outside of the antenna field of view; they serve to maintain the exact distance and to increase the mechanical robustness and stability of the antenna unit. The support posts 908 may have a length of approximately 300 micrometers.

Figure 10A:
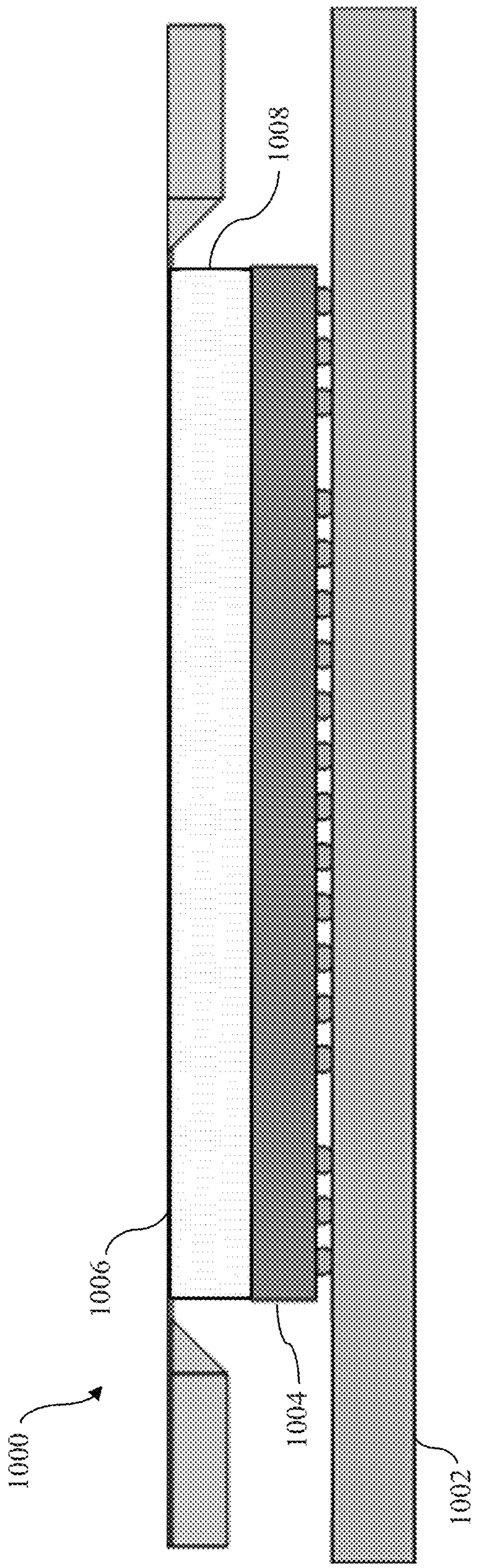
FIG. 10A shows a cross-section of antenna unit according to another illustrative embodiment.
Figure 10B:
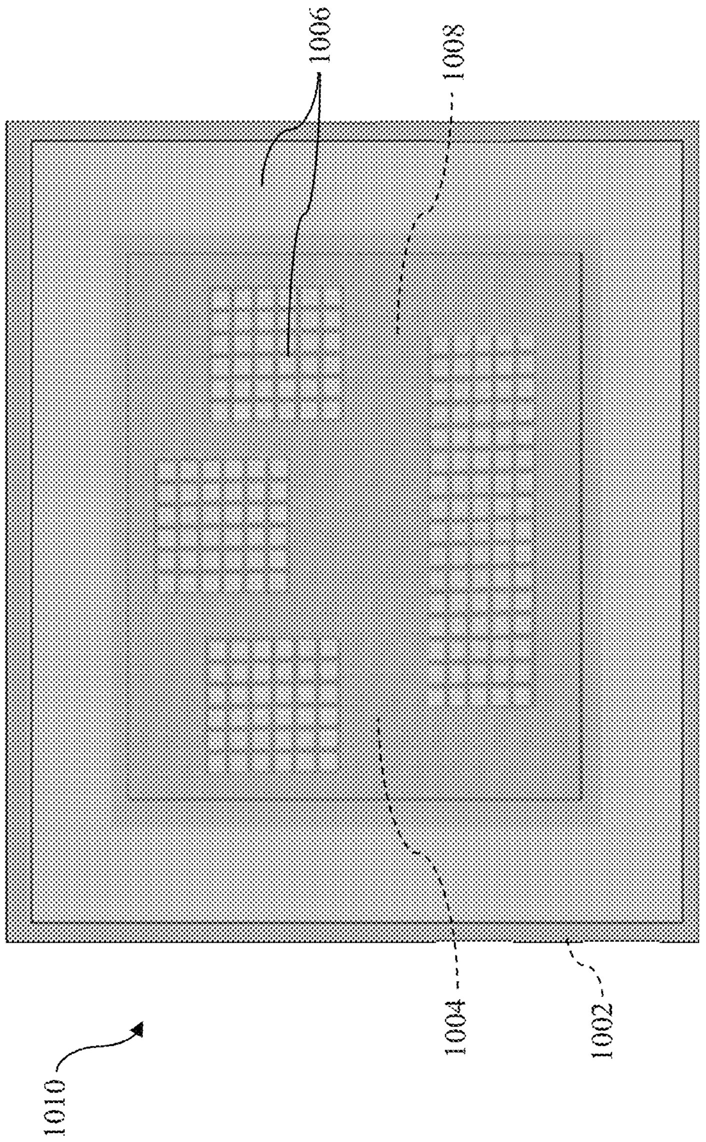
FIG. 10B shows a plan view of the antenna unit shown in FIG. 10A.

FIGS. 10A and 10B show a cross-section 100 and a plan view 1010 of an antenna unit according to another illustrative embodiment. The antenna unit contains an integrated circuit package 1004 and a dielectric layer 1006 placed above the upper surface of the integrated circuit package 1004. The dielectric layer 1006 is separated from the integrated circuit package 1004 by a further dielectric layer 1008. The further dielectric layer 1008 is a layer of low loss foam having a thickness of approximately 300 micrometers, which maintains the mechanical stability of the antenna unit at an acceptable level. Outside the area of the integrated circuit package 1004 (i.e., where the dielectric layer 1006 does not cover the upper surface of the integrated circuit package 1004) the dielectric layer 1006 may be thicker than inside the area of the integrated circuit package 1004. In this way, the mechanical robustness of the antenna unit may be increased. Furthermore, the dielectric layer 1006 is configured to function as a radome. Furthermore, the antenna unit is placed on a printed circuit board 1002. Above the area of the integrated circuit package 1004, the dielectric layer 1006 has a thickness of approximately 60 micrometers. Furthermore, the dielectric layer 1006 is implemented as an artificial dielectric layer as defined above.

Figure 11A:
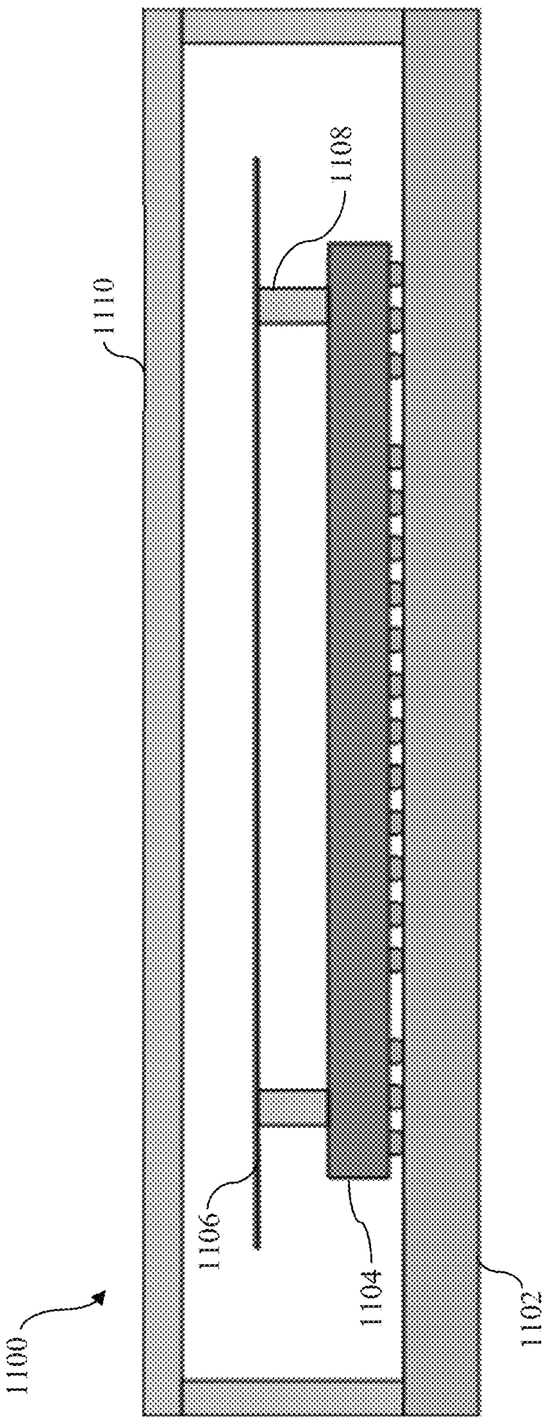
FIG. 11A shows a cross-section of antenna unit according to a further illustrative embodiment.
Figure 11B:
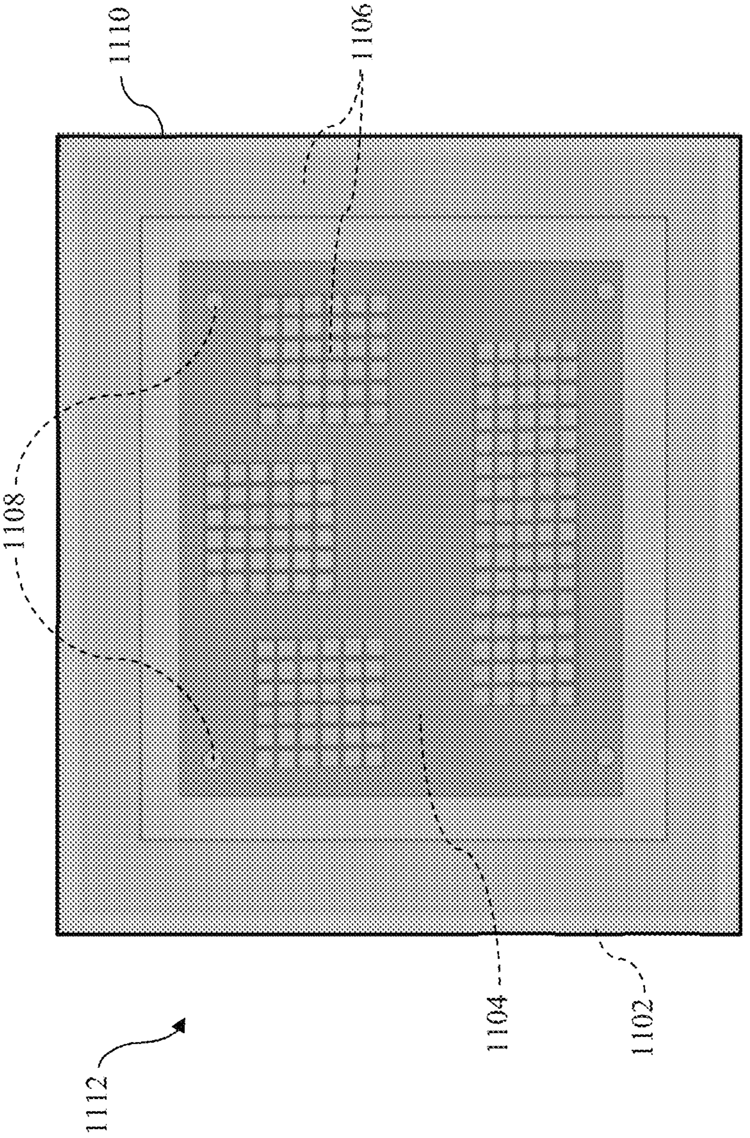
FIG. 11B shows a plan view of the antenna unit shown in FIG. 11A.

FIGS. 11A and 11B show a cross-section 1100 and a plan view 1112, respectively, of an antenna unit according to a further illustrative embodiment. The antenna unit contains an integrated circuit package 1104 and a dielectric layer 1106 placed above the upper surface of the integrated circuit package 1104. The dielectric layer 1106 is separated from the integrated circuit package 1104 by a plurality of a layer of air. The antenna unit contains a plurality of support posts 1108, which facilitate realizing the separation. Furthermore, antenna unit is protected by an additional radome 1110. Furthermore, the antenna unit is placed on a printed circuit board 1102. The dielectric layer 1106 has a thickness of approximately 60 micrometers and is implemented as an artificial dielectric layer as defined above. Furthermore, the support posts 1108 between the upper surface of the integrated circuit package 1104 and the dielectric layer 1106 are placed outside of the antenna field of view; they serve to maintain the exact distance and to increase the mechanical robustness and stability of the antenna unit. The support posts 1108 may have a length of approximately 300 micrometers.

Figure 12:
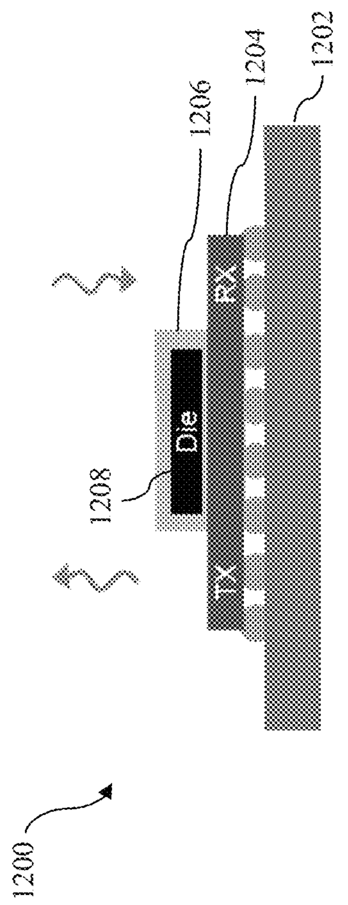
FIGS. 12 to 15 show different integrated circuit package implementations.
Figure 13:
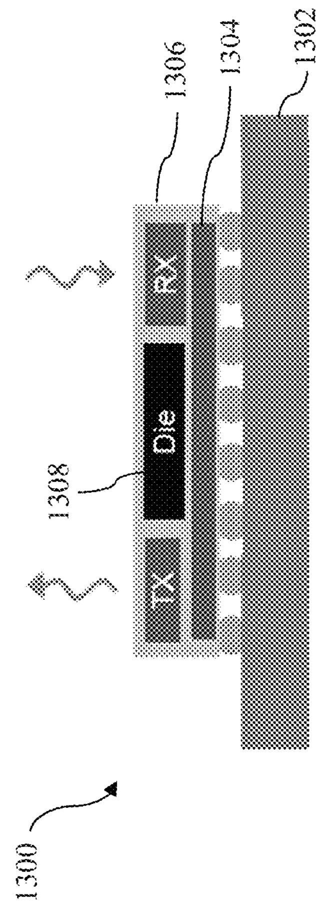
Figure 14:
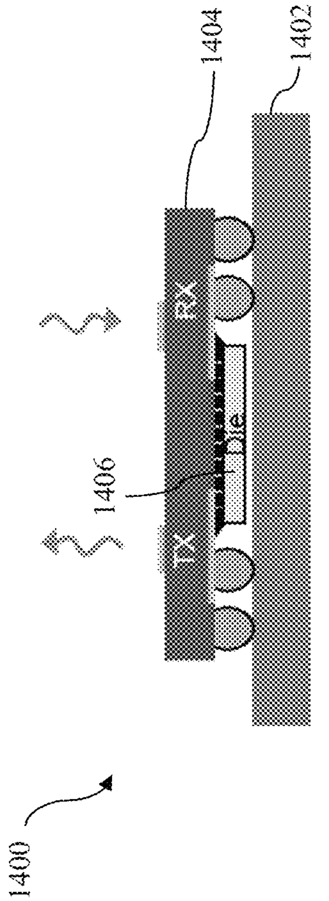
Figure 15:
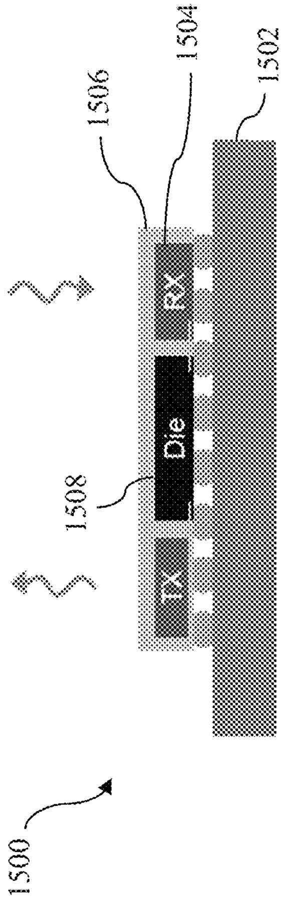

FIGS. 12 to 15 show different integrated circuit package implementations 1200, 1300, 1400, 1500. In particular, FIGS. 12, 13 and 14 show flip chip-chip scale package implementations 1200, 1300, 1400, while FIG. 15 shows a fan-out wafer-level packaging (FO-WLP) implementation 1500. The skilled person will appreciate that an AiP, which includes a slot antenna in the package, may be constructed in a standalone substrate. The substrate is then embedded and connected to the redistribution layer (RDL) of the package. This enables use of higher performing materials and structures, which is not possible when the antenna is incorporated directly into the package layers. In case of a FC-CSP (die on top or die on bottom, i.e. "possum"), the antenna substrate is solder bumped and soldered to a substrate alongside the RF die and interconnected through the FC substrate. In case of a FO-WLP (e.g., eWLB), the antenna substrate is embedded within a mold alongside the RF die and interconnected by the redistribution layer. Both FO-WLP and FC-CSP allow the use of an area array die, and therefore the use of a die with a high input/input and a small form factor. Furthermore, air cavities may be embedded in the package (e.g., by way of glass substrates or novel build-up processes).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word “comprise(s)” or “comprising” does not exclude the presence of elements or steps other than those listed in a claim. The word “a” or “an” preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 antenna unit
102 integrated circuit (IC) package
104 integrated circuit (IC) die
106 antenna structure
108 dielectric layer
200 method of producing an antenna unit
202 providing an antenna unit with an integrated circuit package containing an integrated circuit die and an antenna structure coupled to the integrated circuit die
204 placing a dielectric layer at a predefined distance above the upper surface of the integrated circuit package, thereby separating the dielectric layer from the integrated circuit package
300 antenna unit in a three-dimensional view
302 integrated circuit package
304 dielectric layer
306 air layer
400 antenna unit in a two-dimensional lateral view
402 integrated circuit package
404 dielectric layer
406 air layer
500 array antenna patterns in E-plane
502 angle of the radiation
504 gain
506 plot lines
600 single element antenna pattern in both E-plane and H-plane
602 plot lines
700 first radiation plot in E-plane
702 second radiation plot in E-plane
704 radiation pattern in the E-plane
706 E-plane
708 H-plane
800 normalized radiation pattern
802 single element radiation pattern
804 array radiation pattern for beam pointing at 0°
806 array radiation pattern for beam pointing at 45°
808 normalized radiation pattern
810 element radiation pattern
812 array radiation pattern
900 cross-section of antenna unit
902 printed circuit board
904 integrated circuit package
906 dielectric layer
908 support posts
910 plan view of antenna unit
1000 cross-section of antenna unit
1002 printed circuit board
1004 integrated circuit package
1006 dielectric layer
1008 further dielectric layer
1010 plan view of antenna unit
1100 cross-section of antenna unit
1102 printed circuit board
1104 integrated circuit package
1106 dielectric layer
1108 support posts
1110 radome
1112 plan view of antenna unit
1200 integrated circuit package
1202 printed circuit board
1204 antenna structure
1206 mold compound
1208 integrated circuit die
1300 integrated circuit package
1302 printed circuit board
1304 antenna structure
1306 mold compound
1308 integrated circuit die
1400 integrated circuit package
1402 printed circuit board
1404 antenna structure
1408 integrated circuit die
1500 integrated circuit package
1502 printed circuit board
1504 antenna structure
1506 mold compound
1508 integrated circuit die

The invention claimed is:

1. An antenna unit, comprising:
an integrated circuit package containing an adaptive array of multiple slot antennas embedded in the integrated circuit package, wherein each slot antenna of the multiple slot antennas includes a planar slot antenna element at an upper surface of the integrated circuit package and a cavity embedded in the integrated circuit package below the planar slot antenna element, and wherein the multiple slot antennas of the adaptive array are embedded in the integrated circuit package directly next to each other without intervening circuitry; and
an artificial dielectric layer separated from the integrated circuit package by a layer having a dielectric constant close to one, wherein the artificial dielectric layer is placed at a predefined distance above the upper surface of the integrated circuit package, wherein the artificial dielectric layer includes a superstrate and a first grid of metal patches disposed on a first surface of the superstrate, and wherein the first grid of metal patches extends continuously over all of the multiple slot antennas in a regular pattern.

2. The antenna unit of claim 1, wherein the layer having the dielectric constant close to one is a layer of air.

3. The antenna unit of claim 2, further comprising a plurality of support posts between a lower surface of the dielectric layer and the upper surface of the integrated circuit package.

4. The antenna unit of claim 3, wherein the support posts are placed outside a field of view of the adaptive array of multiple slot antennas.

5. The antenna unit of claim 1, wherein the layer having the dielectric constant close to one is a layer of low loss foam.

6. The antenna unit of claim 1, wherein the artificial dielectric layer has a thickness of approximately 60 micrometers.

7. The antenna unit of claim 1, wherein the predefined distance is approximately 300 micrometers.

8. The antenna unit of claim 1, wherein a surface of the artificial dielectric layer is larger than the upper surface of the integrated circuit package, and wherein parts of the artificial dielectric layer that do not cover the upper surface of the integrated circuit package have a larger thickness than parts of the artificial dielectric layer that cover the upper surface.

9. The antenna unit of claim 1, wherein the artificial dielectric layer is configured to function as a radome.

10. The antenna unit of claim 1, further comprising a radome placed above the artificial dielectric layer and the integrated circuit package.

11. A communication device, in particular a radar communication device, comprising the antenna unit of claim 1.

12. The antenna unit of claim 1, wherein the artificial dielectric layer further includes a second grid of metal patches disposed on a second opposite surface of the superstrate to form a capacitive grid.

13. A method of producing an antenna unit, comprising:

providing the antenna unit with an integrated circuit package, said integrated circuit package containing an adaptive array of multiple slot antennas embedded in the integrated circuit package, wherein each slot antenna of the multiple slot antennas includes a planar slot antenna element at an upper surface of the integrated circuit package and a cavity embedded in the integrated circuit package below the planar slot antenna element, and wherein the multiple slot antennas of the adaptive array are embedded in the integrated circuit package directly next to each other without intervening circuitry; and placing an artificial dielectric layer at a predefined distance above an upper surface of the integrated circuit package, wherein the artificial dielectric layer is separated from the integrated circuit package by a layer having a dielectric constant close to one, wherein the artificial dielectric layer includes a superstrate and a first grid of metal patches disposed on a first surface of the superstrate, and wherein the first grid of metal patches extends over all of the multiple slot antennas in a regular pattern.

14. The method of claim 13, wherein the layer having the dielectric constant close to one is a layer of air.

15. The method of claim 14, further comprising providing the antenna unit with a plurality of support posts between a lower surface of the artificial dielectric layer and the upper surface of the integrated circuit package.

16. The method of claim 15, wherein the support posts are placed outside a field of view of the adaptive array of multiple slot antennas.

17. The method of claim 14, wherein the layer having the dielectric constant close to one is a layer of low loss foam.

18. The method of claim 14, wherein the artificial dielectric layer further includes a second grid of metal patches disposed on a second opposite surface of the superstrate to form a capacitive grid.

* * * * *